(12) United States Patent
Hartmann

(10) Patent No.: US 6,293,504 B1
(45) Date of Patent: Sep. 25, 2001

(54) TUBE HOLDER

(75) Inventor: Georg Hartmann, Aichach (DE)

(73) Assignee: Kuka Roboter GmbH (DE)

( * ) Notice: Subject to any disclaimer, the term of this patent is extended or adjusted under 35 U.S.C. 154(b) by 0 days.

(21) Appl. No.: 09/371,242

(22) Filed: Aug. 10, 1999

(30) Foreign Application Priority Data

Aug. 11, 1998 (DE) ............................. 298 14 174 U

(51) Int. Cl.$^7$ ...................................... F16L 3/08

(52) U.S. Cl. ............................. 248/74.1; 24/270

(58) Field of Search ................... 248/74.1, 74.4, 248/74.2, 231.51, 230.4, 51, 316.5, 903; 24/270, 271, 273

(56) References Cited

U.S. PATENT DOCUMENTS

| 196,807 | * | 11/1877 | Jolliffe et al. | 285/409 |
|---|---|---|---|---|
| 2,122,988 | * | 7/1938 | Nelson | 378/194 |
| 3,305,199 | * | 2/1967 | Bayes et al. | 248/74.1 |
| 4,705,243 | * | 11/1987 | Hartmann et al. | 248/51 |
| 6,056,245 | * | 5/2000 | White | 248/58 |

* cited by examiner

Primary Examiner—Anita King
Assistant Examiner—Holly N. Sy
(74) Attorney, Agent, or Firm—McGlew & Tuttle, P.C.

(57) ABSTRACT

A tube holder, particularly for holding a protective tube for cables on a robot, with two mutually articulated half-shells closable by a lever provided with a spring clip, is characterized in that on either side of the lever are formed radially extending protective ribs, which cover the circumferential contour of the lever in the closed position thereof

8 Claims, 5 Drawing Sheets

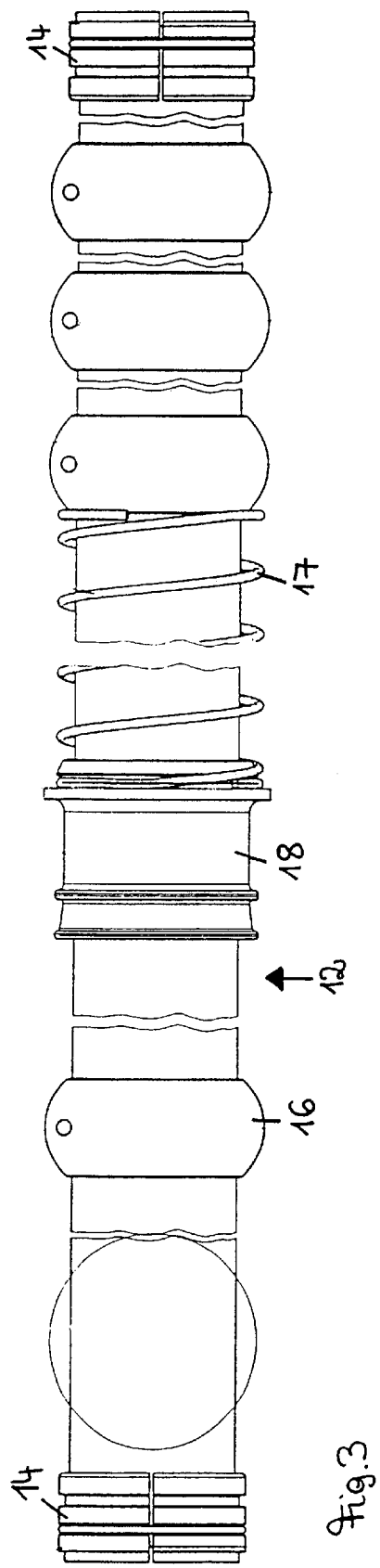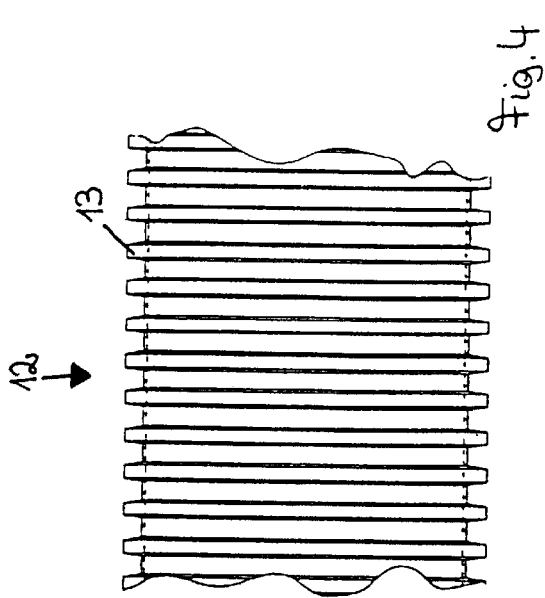

TUBE HOLDER

FIELD OF THE INVENTION

The invention relates to a tube holder, particularly for holding a protective tube for cables on a robot, with two mutually articulated half-shells closable by a lever provided with a spring clip.

BACKGROUND OF THE INVENTION

Such hose or tube holders are in particular provided on robots, in order to hold in an axially movable manner protective tubes for electric cables on the outside of the robot. The tube holders are fixed by means of an open, cross-sectionally trapezoidal base to a holder, such as part of the robot, an arm or a rocker, the free ends of the trapezoidal base generally being connected in one piece with the tube holder opening in trumpet-like manner towards its free end faces. The trumpet-like opening walls of the tube holder defining the tube passage are elastic and formed from two interconnected half-shells. Relative movements of the tube holder with respect to the robot part holding it can occur and give rise to parallelogram like movements of the tube holder base. As a result of such movements and the dynamic forces acting on the tube holder, it is easily possible for damage and breakage thereof to occur.

In addition, in a known tube holder the locking lever for closing the two half-shells of the tube holder is freely positioned above said tube-guiding walls. There is consequently a risk that unintentional movements, optionally also the sliding past one another of the parts, will lead to a movement of the lever and to the opening of the tube holder. The tube can then drop out of the tube holder, which can have significant disadvantageous consequences when the robot is moving.

SUMMARY AND OBJECTS OF THE INVENTION

Thus, whilst avoiding the aforementioned disadvantages, the problem of the invention is to so further develop a tube holder of the aforementioned type that in particular an unintentional opening of said tube holder is avoided. It must also be possible to securely, firmly and stably fix the tube holder to the part holding it.

In a tube holder of the aforementioned type, the invention solves this problem in that on either side of the lever are formed radially extending protective ribs, which cover the circumferential contour of the lever in its closed position.

In that on either side of the lever are provided ribs radially projecting over it in its closed position, it is possible to reliably prevent an unintentional movement and opening of the lever through parts or elements moving along the tube holder. Due to the fact that the base is reinforced by axially parallel ribs in the vicinity of its legs, parallelogram-like movements of the base and therefore movements of the tube holder relative to the part holding it are reliably prevented.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 A protective tube for cables with its essential components.

FIG. 4 A larger-scale representation of a detail of the protective tube of FIG. 3.

DESCRIPTION OF THE PREFERRED EMBODIMENT

Figure 1:
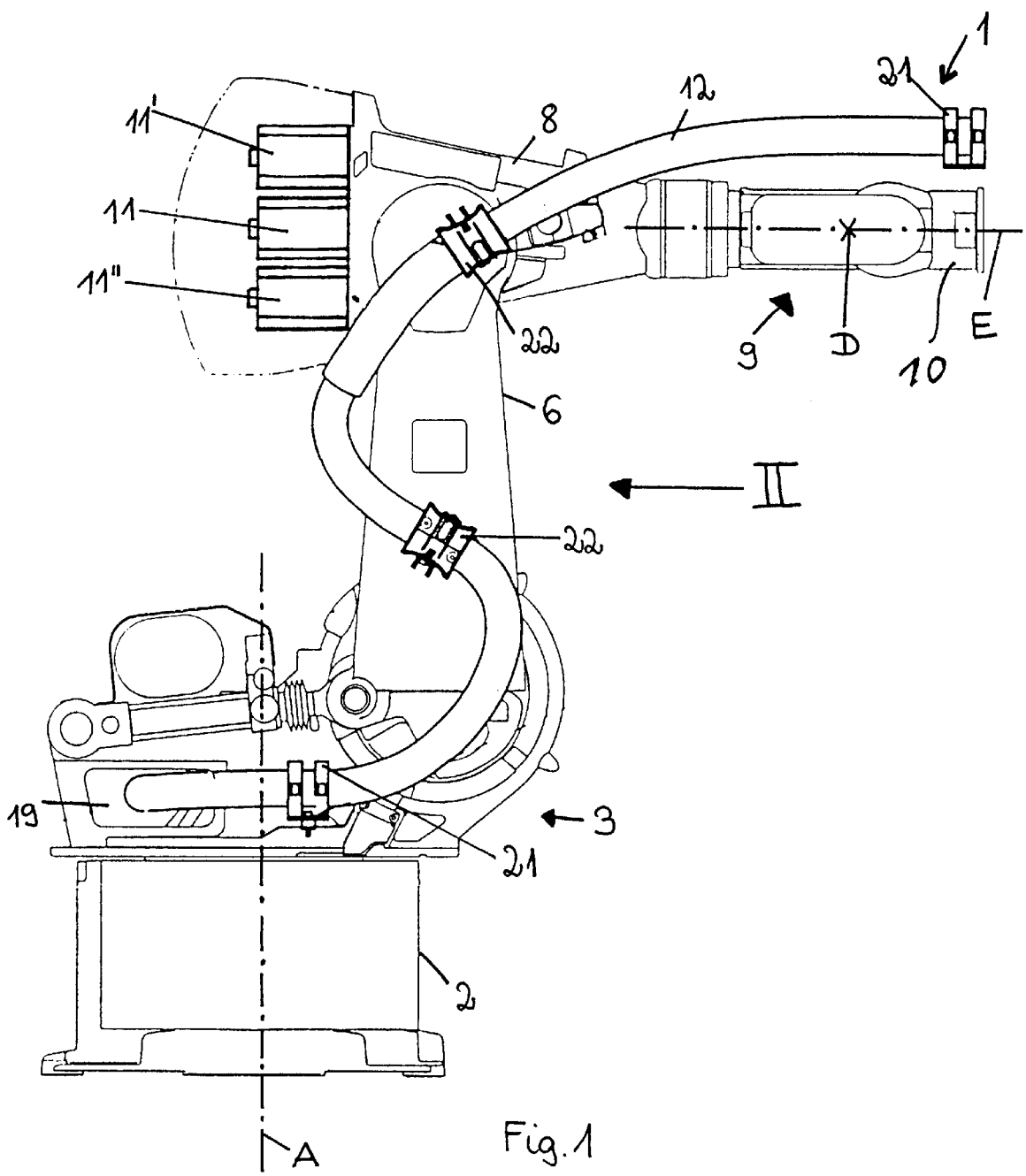
FIG. 1 A robot in side view.

The robot 1 of FIG. 1 has a base 2 firmly connected to the ground and on which is located the robot base member 3 or "roundabout" rotatable about the horizontal A-axis. With the latter a rocker 6 can pivot about the vertical B-axis by means of a motor 4. To its free end remote from the base 3 is provided a robot arm 8 pivotable with it about the horizontal C-axis by means of the motor 7. The arm 8 carries at its front, free end 9 a robot hand 10, which is in turn pivotable about at least one further, horizontal D-axis and the E-axis perpendicular thereto. The pivoting about the E-axis can take place through a drive motor 11 located at the rear end of the arm 8 by means of drive elements extending through said arm 8. Further movements of a complicated robot hand, such as a double angle hand or a tool can be brought about by further motors 11, 11' located at the rear end of the arm 8, once again by means of drive elements extending through said arm 8.

Both the motors and also the tools, such as e.g. a welding tool, must be supplied with power from the robot base 2. This can take place through the robot elements (rocker, arm) or on the outside of the robot, which is in many cases more advantageous.

To protect the cables for a power supply to the motors and tools, they are surrounded by a protective tube 12, which is guided along the outside of the robot and fixed in punctiform manner thereto.

The protective tube 12 is provided with ribs 13. At its ends the tube is provided with end pieces 14. It can have wearing rings 16, as well as a compression spring 17, which bring it into a starting position on relieving with respect to the robot movement. A spring end holder 18 is provided as an abutment for the compression spring.

In the represented embodiment, the tube is fixed to the base 3 by a bulk-head 19, as well as over the tube length by clamp straps 21 and so-called trumpets 22.

The wearing rings 16 prevent a direct rubbing and therefore damage to the tube on moving robot parts, such as rocker 6, arm 8 and hand 11. The tube holder 22 supports and guides the tube 12 at one or more points on the robot arm 8 and rocker 6.

Figure 2:
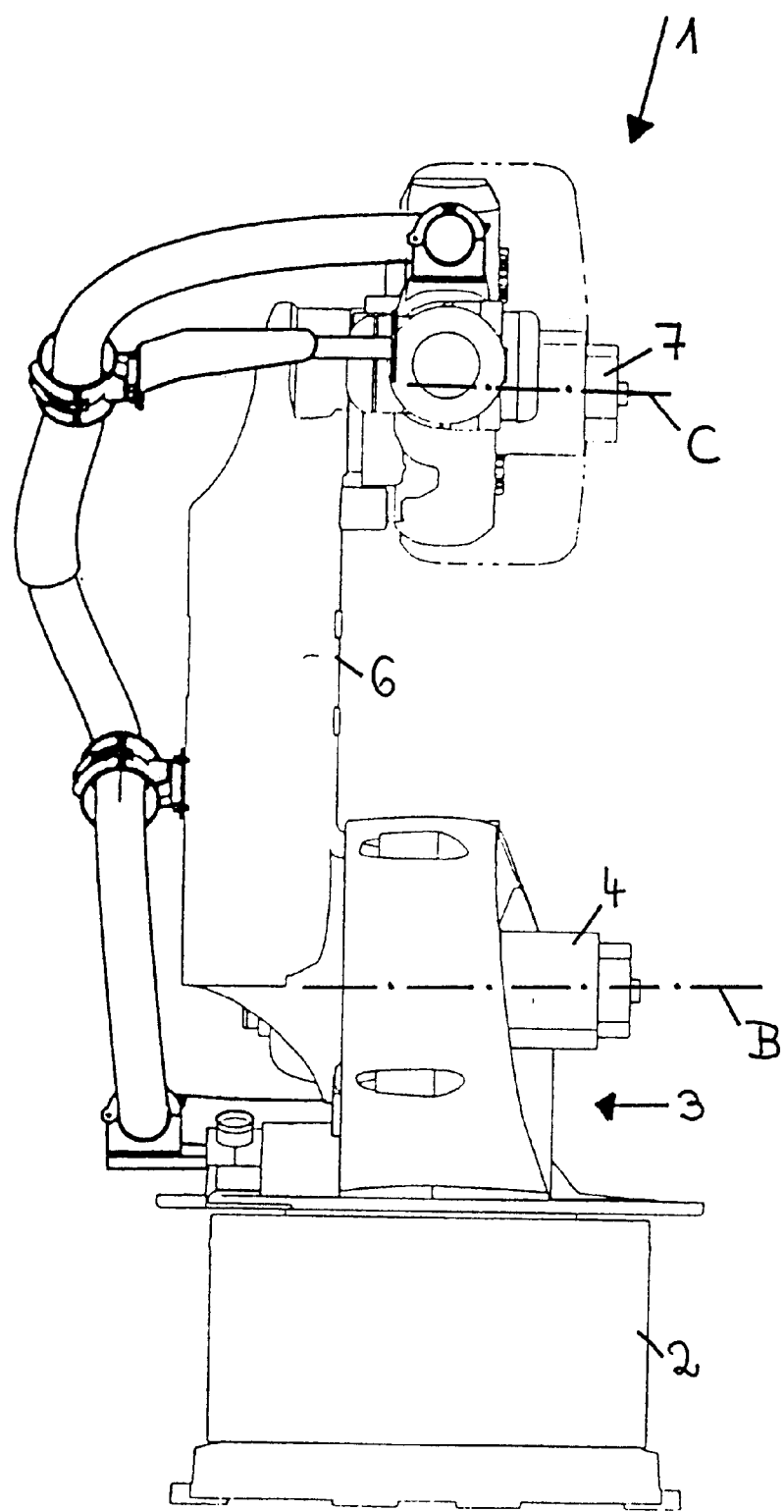
FIG. 2 The robot in front view corresponding to arrow II in FIG. 1.
Figure 5:
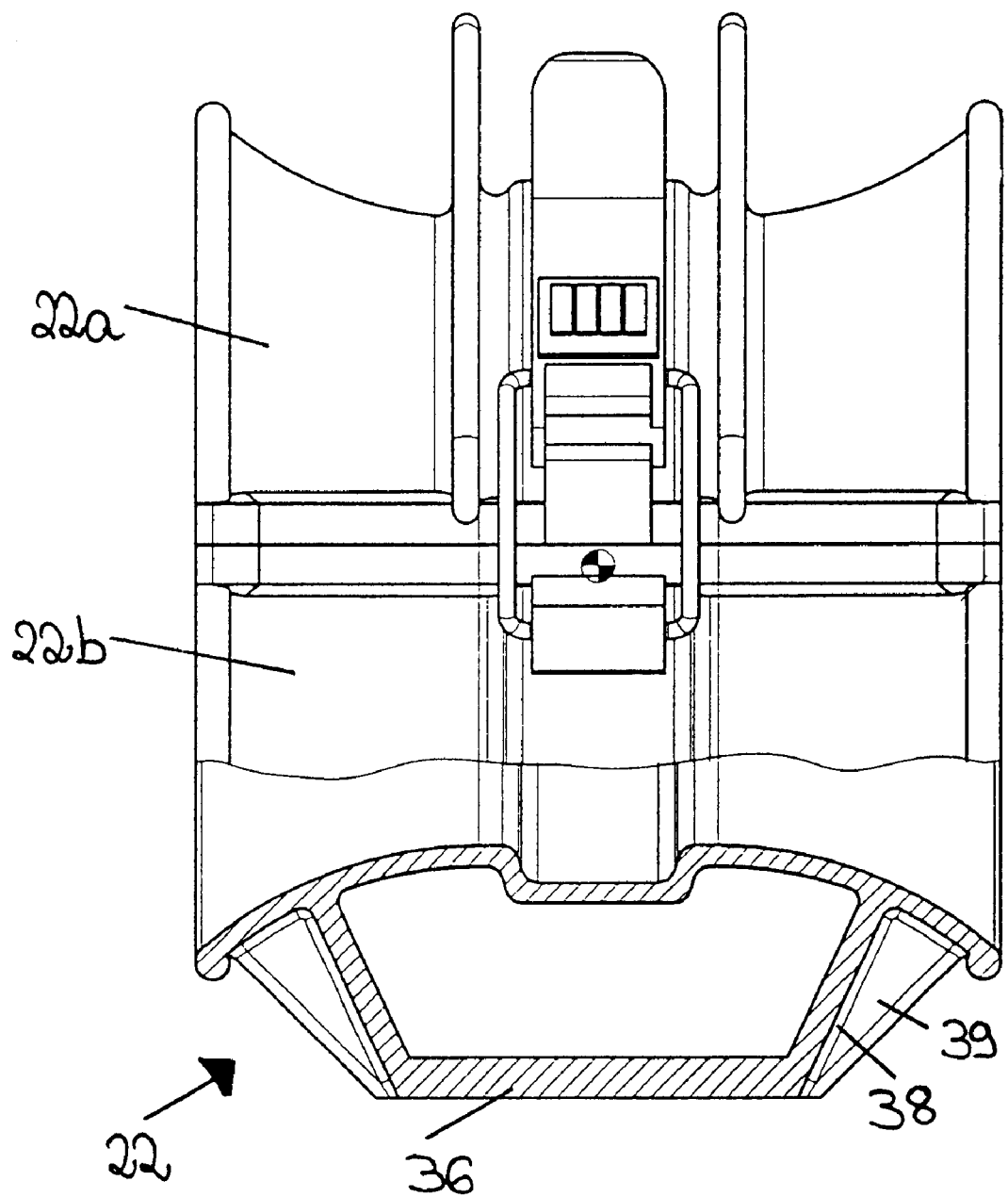
FIG. 5 A side view of the inventive tube holder, partly in section.
Figure 6:
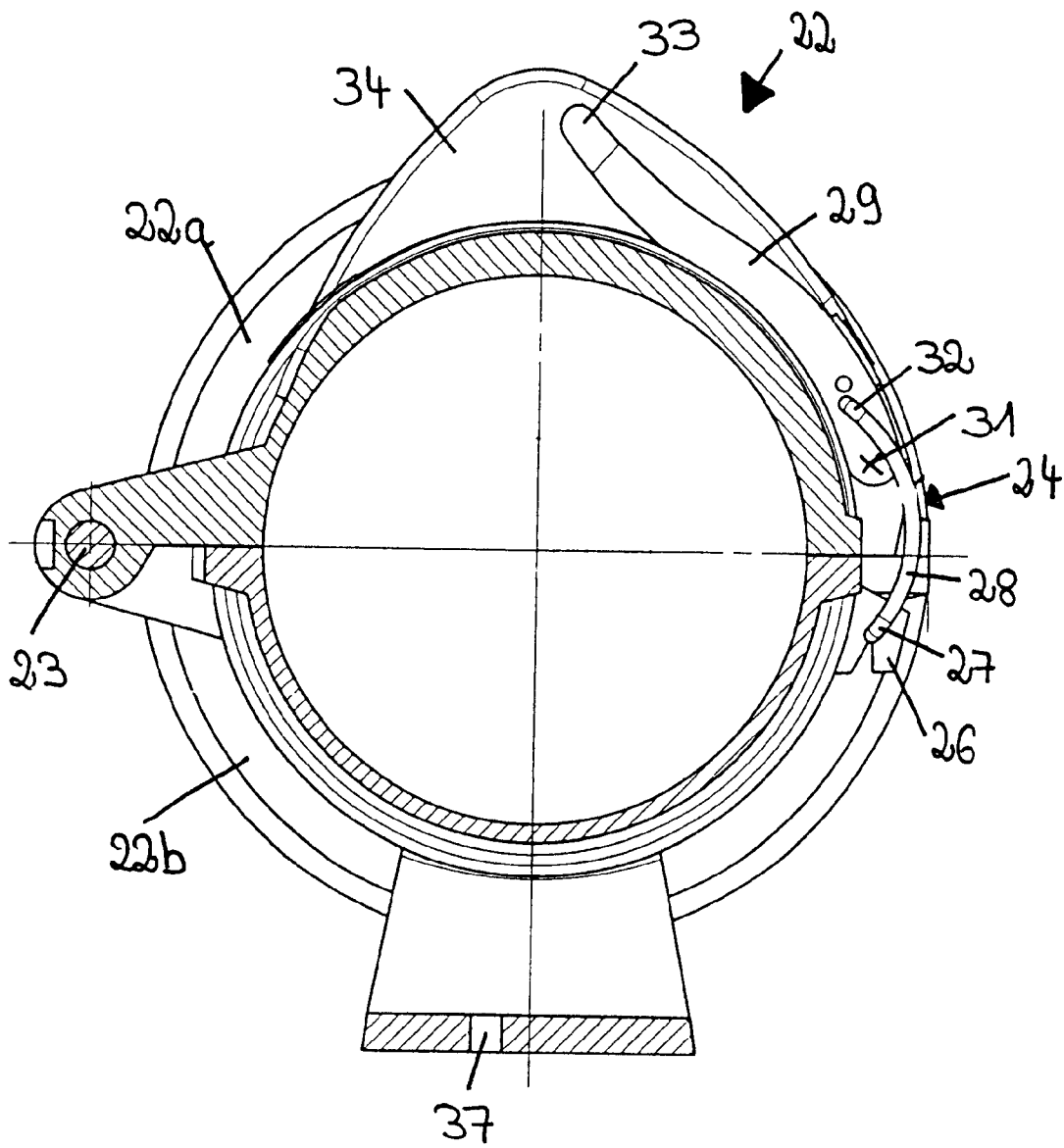
FIG. 6 A vertical section through the inventive tube holder of FIG. 5.

A tube holder, whose use is shown in FIGS. 1 and 2 and with which the protective tube 12 is held in axially differing manner on the robot, is shown in detail in FIGS. 5 and 6.

The tube holder 22 opens from its central area towards its free ends in trumpet-like manner. It comprises two half-shells 22a, 22b, which are pivotably articulated to one another at 23, so that the tube holder is opened and when in its open state the protective tube is inserted and then said tube holder 22 can be closed again.

For securing the closed position of the tube holder 22 a locking mechanism 24 is provided and has on the lower half-shell 22b a locking nose 26 provided with a groove-like undercut. In the same engages the free web 27 of a spring clip 28, which with its end remote from the web 27 is fixed in the form of two ends bent relative to its legs to a pivoted lever 29. The spring clip 28 is articulated to the pivoted lever 29 at a point 32 eccentrically to the bearing axis 31 thereof on the upper half-shell 22a, namely between the bearing axis 31 of the pivoted lever 29 and its free operating end 33.

Parallel to the pivoted lever 29 are provided on the upper half-shell 22a, two radially extending protective rubs 34, which completely cover the radial contour of the pivoted lever 29 in its closed position engaging on the upper shell 22a, as shown in FIG. 6. This ensures that the pivoted lever 29 is not unintentionally opened by parts moving along it, so as to open the complete tube holder.

The tube holder 22 is fixable to the robot by means of a trapezoidal base 36 constructed in one piece on its lower half-shell 22b by means of a screw fastening using an opening 37. The base 36 is connected by its trapezoidally opening legs to the more or less flexible, trumpet-like extensions of the tube holder. In the construction according to the invention, in addition to the legs 38 of the trapezoidal base 36 forming substantially axis-perpendicular planes, axially parallel directed ribs 39 are provided thereon, which stiffen the base 36 and thereby prevents a parallelogram like movement of the base 36.

What is claimed is:

1. A tube holder for a robot, the tube holder comprising:
    two half shells, with trumpet-shaped expansions at end of said half shells ends, said half shells being articulated to one another;
    a lever fixed to one of said half shells;
    a spring clip connected to said lever and also connectable to another of said half shells, said lever and said spring clip holding said two half shells closed;
    radially extending protective ribs on one of said half shells on both sides of said lever, said protective ribs cover a circumferential contour of said lever in a closed position of said lever.

2. A tube holder in accordance with claim 1, further comprising:
    a fastening base connected to one of said half shells for fastening the tube holder;
    a plurality of stiffening ribs on said fastening base.

3. A tube holder for a robot, the tube holder comprising:
    a first half shell;
    a second half shell with a hinge pivotally connect said said second half shell to said first half shell, said first and second half shells having trumpet shaped expansions at opposite axial ends, said trumpet shaped expansions being receivable of a tube;
    a lever mounted on one of said half shells;
    a spring clip connected to said lever and connectable to another of said half shells;
    first and second protective ribs mounted on said one half shell on opposite sides of said lever, said protective ribs extend radially outward from said one half shell further than a radial extension of said lever from said one half shell along an entire circumferential contour of said lever.

4. A tube holder in accordance with claim 3, wherein:
    said lever is movable between a closed and opened position for opening and closing said first and second half shells, said protective ribs cover said lever in said closed position;
    said spring clip has a curve.

5. A tube holder in accordance with claim 3, further comprising:
    a fastening base connected to one of said half shells for fastening the tube holder;
    a plurality of stiffening ribs on said fastening base.

6. A tube holder in accordance with claim 3, wherein:
    said lever is mounted directly on said one half shell.

7. A tube holder in accordance with claim 3, wherein:
    said protective ribs are only arranged on said one half shell connected to said lever.

8. A tube holder in accordance with claim 4, further comprising:
    a fastening base connected to one of said half shells for fastening the tube holder;
    a plurality of stiffening ribs on said fastening base;
    said lever being mounted directly on said one half shell;
    said protective ribs are only arranged on said one half shell connected to said lever.

* * * * *

UNITED STATES PATENT AND TRADEMARK OFFICE
CERTIFICATE OF CORRECTION

PATENT NO. : 6,293,504 B1  
DATED : September 25, 2001  
INVENTOR(S) : Georg Hartmann and Aichach Page 1 of 1

It is certified that error appears in the above-identified patent and that said Letters Patent is hereby corrected as shown below:

<u>Title page,</u>
Item [30], please correct the priority filing number to read -- (DE) 298 14 417.4 --

Signed and Sealed this

Twenty-eighth Day of May, 2002

Attest:

JAMES E. ROGAN  
*Director of the United States Patent and Trademark Office*

*Attesting Officer*